(12) United States Patent
Kimoto

(10) Patent No.: US 7,453,518 B2
(45) Date of Patent: Nov. 18, 2008

(54) FIELD INTERPOLATION METHOD DETERMINATION DEVICE

(75) Inventor: Takayuki Kimoto, Hirakata (JP)

(73) Assignee: Panasonic Corporation, Osaka (JP)

( * ) Notice: Subject to any disclaimer, the term of this patent is extended or adjusted under 35 U.S.C. 154(b) by 840 days.

(21) Appl. No.: 10/509,572

(22) PCT Filed: Mar. 28, 2003

(86) PCT No.: PCT/JP03/03927

§ 371 (c)(1),
(2), (4) Date: Sep. 29, 2004

(87) PCT Pub. No.: WO03/084227

PCT Pub. Date: Oct. 9, 2003

(65) Prior Publication Data

US 2005/0254792 A1   Nov. 17, 2005

(30) Foreign Application Priority Data

Apr. 1, 2002 (JP) .............................. 2002-098368

(51) Int. Cl.
*H04N 7/01* (2006.01)
(52) U.S. Cl. ..................... 348/448; 348/452; 348/459; 348/701; 348/911
(58) Field of Classification Search ................. 348/448, 348/452, 451, 459, 911, 97, 446, 449, 441, 348/700, 701; 386/131, 111; 382/236, 300; 375/240.13
See application file for complete search history.

(56) References Cited

U.S. PATENT DOCUMENTS

| 5,563,651 | A | 10/1996 | Christopher et al. |
| 6,795,123 | B2 * | 9/2004 | Gotanda et al. ............. 348/448 |
| 7,012,649 | B2 * | 3/2006 | Michel ....................... 348/448 |
| 7,274,404 | B1 * | 9/2007 | He et al. ..................... 348/448 |

FOREIGN PATENT DOCUMENTS

| JP | 4-072966 | 3/1992 |
| JP | 6-105292 | 4/1994 |
| JP | 9-18784 | 1/1997 |
| JP | 9-322126 | 12/1997 |
| JP | 2000-078535 | 3/2000 |
| JP | 2000-341648 | 12/2000 |
| JP | 2001-094950 | 4/2001 |
| JP | 2001-169252 | 6/2001 |

* cited by examiner

*Primary Examiner*—M. Lee
*Assistant Examiner*—Jean W Désir
(74) *Attorney, Agent, or Firm*—Wenderoth, Lind & Ponack, L.L.P.

(57) ABSTRACT

Correlation of videos between fields is determined between a difference between an input interlaced signal and a signal that is delayed by one field with respect to the input interlaced signal. Correlation among N-1 sequential fields is compared with a predetermined pattern to determine whether the input interlaced signal is unquestionably a telecine-converted signal, whether it is unquestionably not a telecine-converted signal, or whether it cannot be said to be unquestionably a telecine-converted signal. If a determination of being unquestionably a telecine-converted signal is continued for a predetermined number or more of fields, an instruction signal, which instructs to perform inter-field interpolation on the input interlaced signal, is outputted.

10 Claims, 11 Drawing Sheets

FIG. 3

| REGISTER 85 R1 | REGISTER 86 R2 | REGISTER 87 R3 | REGISTER 88 R4 | COUNTER INPUT |
|---|---|---|---|---|
| 0 | 1 | 0 | 1 | INCREMENT |
| 1 | 0 | 1 | 0 | INCREMENT |
| 0 | 0 | 0 | 0 | CANCEL |
| 0 | 0 | 0 | 1 | CANCEL |
| 0 | 0 | 1 | 0 | CANCEL |
| 0 | 1 | 0 | 0 | CANCEL |
| 1 | 0 | 0 | 0 | CANCEL |
| 0 | 0 | 1 | 1 | RESET |
| 0 | 1 | 1 | 0 | RESET |
| 0 | 1 | 1 | 1 | RESET |
| 1 | 0 | 0 | 1 | RESET |
| 1 | 0 | 1 | 1 | RESET |
| 1 | 1 | 0 | 0 | RESET |
| 1 | 1 | 0 | 1 | RESET |
| 1 | 1 | 1 | 0 | RESET |
| 1 | 1 | 1 | 1 | RESET |

The first two rows are labeled Tc, the next five rows are labeled T1, and the last nine rows are labeled Tr.

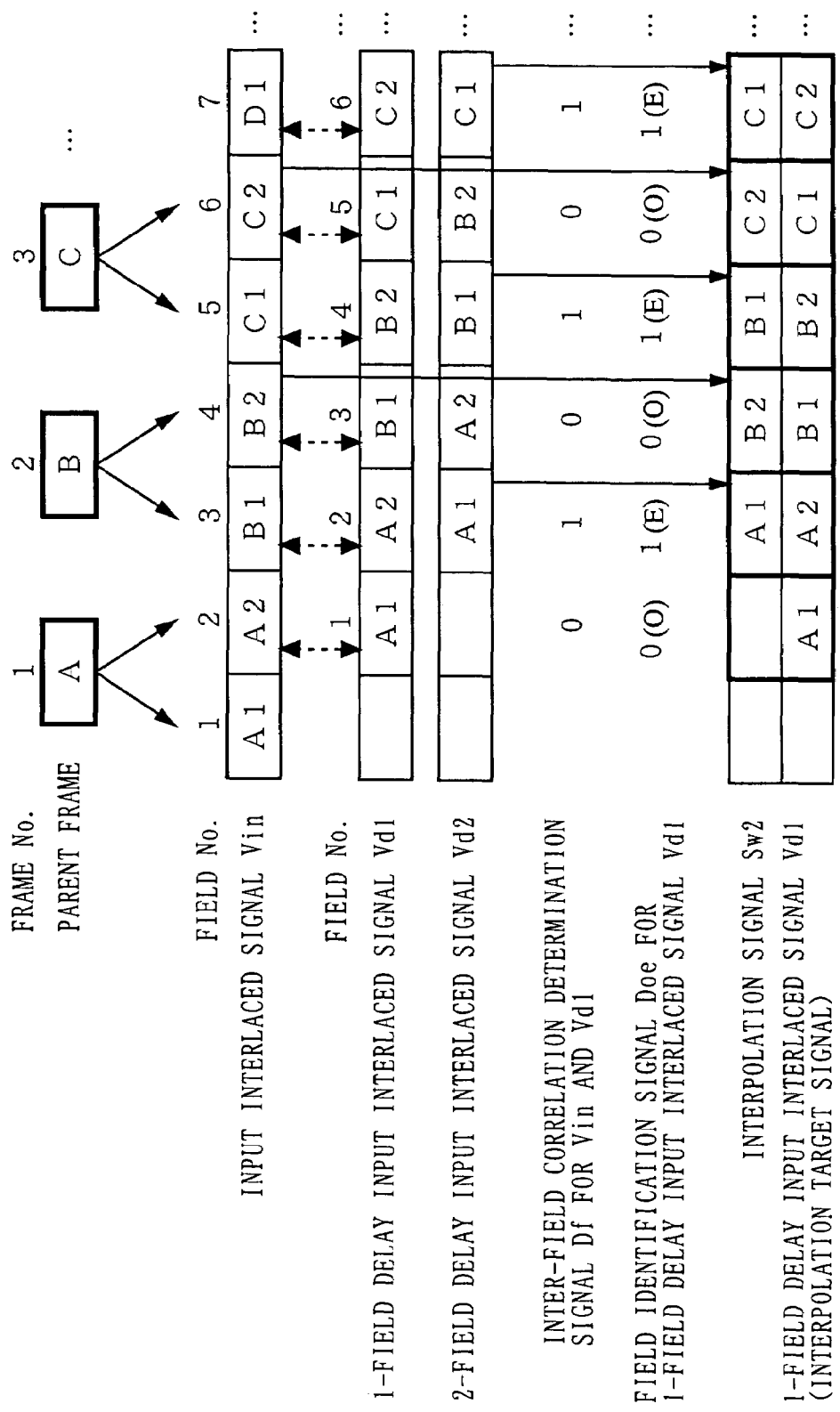
F I G. 4

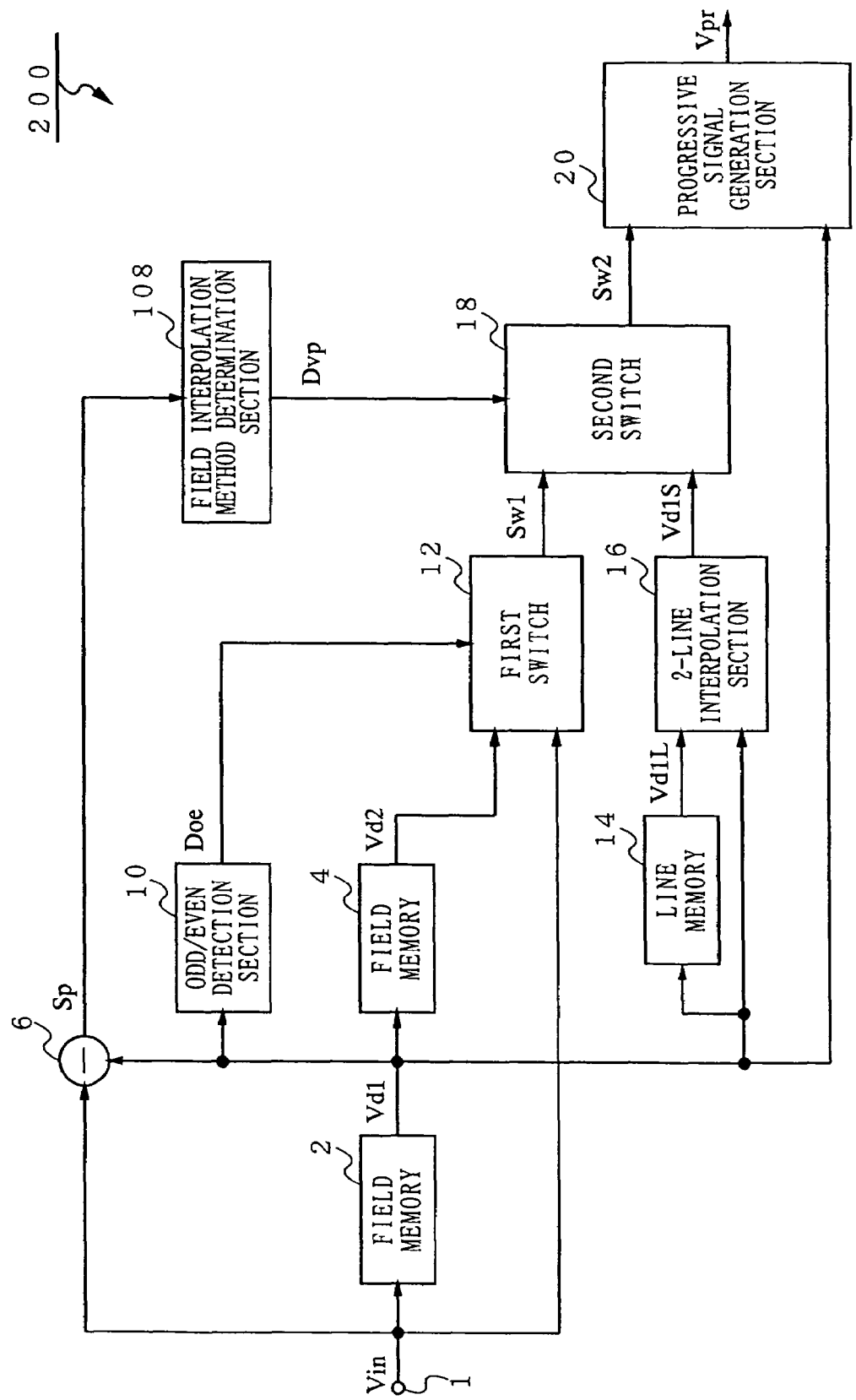
FIG. 10 - PRIOR ART

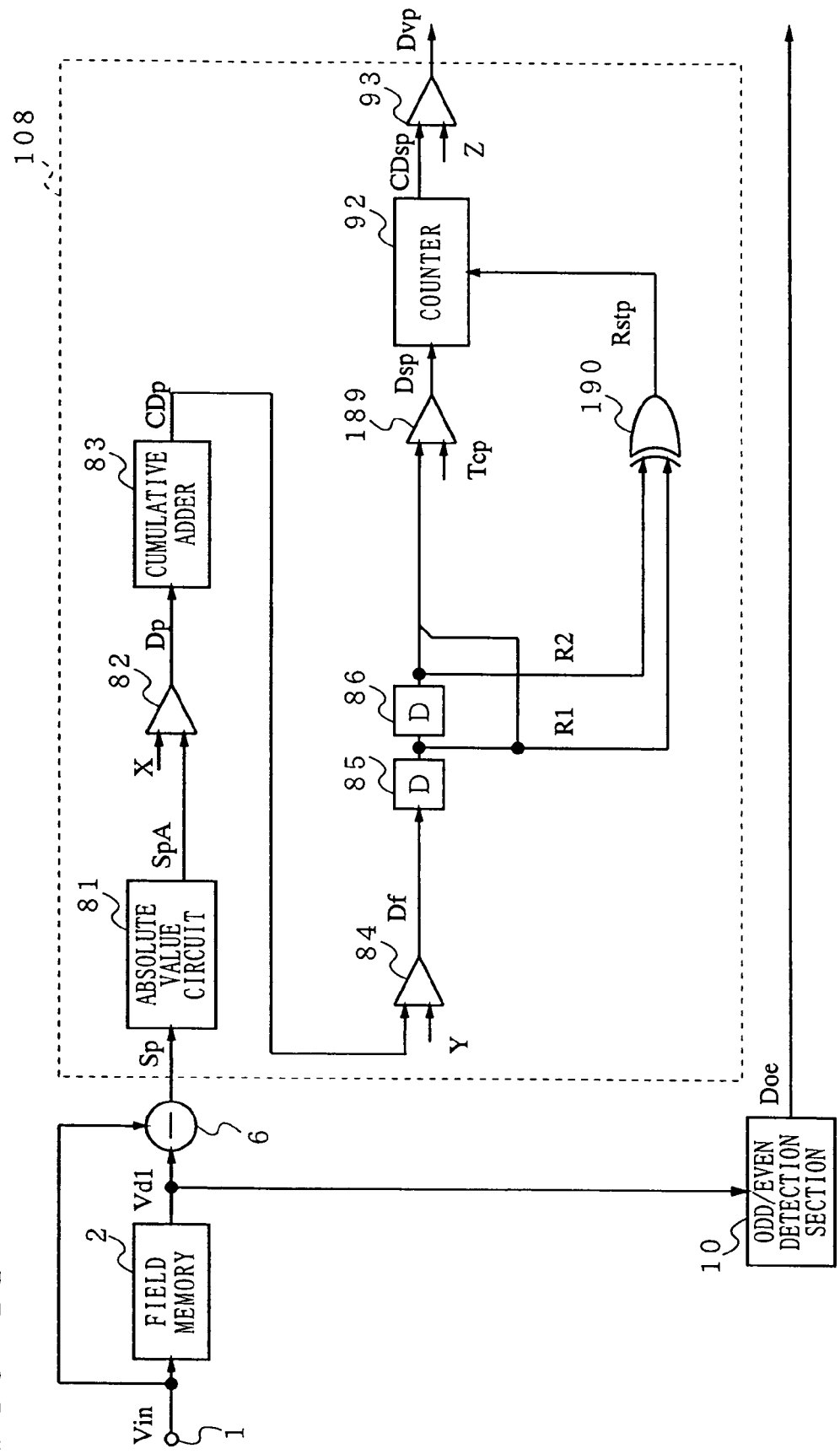
FIG. 11 - PRIOR ART

FIELD INTERPOLATION METHOD DETERMINATION DEVICE

TECHNICAL FIELD

The present invention relates to a field interpolation method determination device for determining whether to perform either an inter-field interpolation method or an intra-field interpolation method on fields of an inputted interlaced signal to provide conversion to a progressive signal.

BACKGROUND ART

Interlaced signals to be converted into progressive signals are classified into ordinary signals for images scanned by interlaced scanning and interlaced signals converted from progressive signals. A typical example of the latter is a telecine-converted signal.

In a 2-2 pulldown method, which is a telecine conversion method, the telecine-converted signal is generated as follows. Firstly, frames of a 24 frame-per-second movie film are sequentially scanned to generate a 24 frame-per-second progressive signal. Then, each frame (parent frame) of the progressive signal is converted into an odd field of an interlaced signal and an even field following immediately thereafter.

For example, the first frame of a movie film (a first parent frame of the progressive signal) is converted into first and second fields, while the second frame of the movie film (a second parent frame of the progressive signal) is converted into third and fourth fields.

Thus, visual images in the first and second fields converted from the same parent frame are similar to each other, and therefore there is only a small difference between the visual images. As for the second and third fields converted from different parent frames, an inter-field visual difference reflects a difference between the parent frames, and therefore is large as compared to the former case. That is, a difference between adjacent fields varies alternately between large and small among the fields in accordance with a parent frame-to-field relationship.

Such a characteristic of the telecine-converted signal also holds for a 60 field-per-second interlaced signal obtained by 2-2 pulldown-converting a progressive signal captured by a 30 P video camera for generating a 30 frame-per-second progressive video signal.

Also, in a 2-3 pulldown method which is used for telecine conversion to an NTSC (60 field-per-second) interlaced signal, one frame of the movie film is converted into two fields, and the next frame is converted into 3 fields, and the conversion pattern is repeated for every two frames. A 2-3 pulldown telecine-converted signal also has the above characteristic because it exhibits a regular pattern in which an inter-field pixel level difference varies in accordance with a parent frame-to-field relationship.

Japanese Laid-Open Patent Publication No. 9-18784 (claiming a priority of U.S. application No. 94-366799) discloses a field interpolation method determination device which identifies whether an input interlaced signal is a telecine-converted signal based on an inter-field difference of the input interlaced signal, and determines a field interpolation method.

Referring to FIG. 10, a video signal processing device having incorporated therein a conventional field interpolation method determination device is described. A video signal processing device 200 shown in the figure converts an interlaced signal into a progressive signal by carrying out inter-field interpolation only when an interlaced signal is a telecine-converted signal, while intra-field interpolation is carried out if it is not the telecine-converted signal.

The video signal processing device 200 includes an input terminal 1, a field memory 2, a subtractor 6, a field interpolation method determination section 108, an ODD/EVEN detection section 10, a first switch 12, a line memory 14, a 2-line interpolation section 16, a second switch 18, and a progressive signal generation section 20.

The input terminal 1 is supplied with an input interlaced signal Vin. The field memory 2 outputs a 1-field delay input interlaced signal Vd1 delayed by one field with respect to the input interlaced signal Vin. The 1-field delay input interlaced signal Vd1 is inputted into the progressive signal generation section 20 where either inter-field interpolation or intra-field interpolation is performed on the signal.

The subtractor 6 obtains a difference in pixel level between the input interlaced signal Vin and the 1-field delay input interlaced signal Vd1, and outputs it as an inter-field pixel level difference Sp. Note that in the interlaced signal, scanning lines of adjacent fields are displaced by one row from each other. Accordingly, the subtractor 6 obtains a difference between an average pixel level for two adjacent lines in one field and a corresponding pixel level in the other field.

The field interpolation method determination section 108 determines whether the input interlaced signal Vin is a telecine-converted signal based on the inter-field pixel level difference Sp. The field interpolation method determination section 108 outputs a field interpolation method instruction signal Dvp that instructs to perform either the inter-field interpolation or the intra-field interpolation on the 1-field delay input interlaced signal Vd1.

If a field interpolation method instruction signal Dvp, which instructs to perform the inter-field interpolation is inputted, the second switch 18 selects an inter-field interpolation video signal Sw1 outputted from the first switch 12, and outputs it as an interpolation video signal Sw2.

The inter-field interpolation video signal Sw1 is either of a 2-field delay input interlaced signal Vd2 and an input interlaced signal Vin, which respectively correspond to fields before and after the 1-field delay input interlaced signal Vd1, and it is selected as follows.

The ODD/EVEN detection section 10 detects whether the signal corresponds to an odd field or an even field based on the 1-field delay input interlaced signal Vd1, and outputs a field identification signal Doe which indicates a detection result.

The first switch 12 selects either the 2-field delay input interlaced signal Vd2 or the input interlaced signal Vin based on the field identification signal Doe, and outputs it as the inter-field interpolation video signal Sw1. Specifically, the first switch 12 outputs the input interlaced signal Vin if the 1-field delay input interlaced signal Vd1 corresponds to an odd field, while it outputs the 2-field delay input interlaced signal Vd2 if the 1-field delay input interlaced signal Vd1 corresponds to an even field.

The progressive signal generation section 20 interpolates the 1-field delay input interlaced signal Vd1 with the interpolation video signal Sw2 outputted from the second switch 18 (in this case, either one of the current signal Vin and the 2-field delay input interlaced signal Vd2, which has been selected by the first switch 12), thereby generating a progressive signal. The frame of the thus-generated progressive signal is identical to the original parent frame, and enhanced in terms of vertical resolution as compared to a frame generated by intra-field interpolation which will be described later.

On the other hand, if a field interpolation method instruction signal Dvp, which instructs to carry out intra-field interpolation, is outputted from the field interpolation method determination section 108, the second switch 18 selects an intra-field interpolation video signal Vd1S outputted from the 2-line interpolation section 16, and outputs it as an interpolation video signal Sw2.

The 2-line interpolation section 16 generates an intra-field interpolation video signal Vd1S based on a 1-line delay signal Vd1L, which is obtained by delaying the 1-field delay input interlaced signal Vd1 by one line in the line memory 14, and the 1-field delay input interlaced signal Vd1.

The progressive signal generation section 20 interpolates the 1-field delay input interlaced signal Vd1 with the interpolation video signal Sw2 outputted from the second switch 18 (in this case, the intra-field interpolation signal Vd1S), thereby generating a progressive signal.

The subtractor 6 and the field interpolation method determination section 108 shown in FIG. 10 correspond to the conventional field interpolation method determination device. Referring to FIG. 11, the conventional field interpolation method determination device is described. FIG. 11 is a block diagram showing a detailed structure of the field interpolation method determination section 108 shown in FIG. 10.

The field interpolation method determination section 108 includes an absolute value circuit 81, a pixel difference determination comparator 82, a cumulative adder 83, an inter-field correlation determination comparator 84, a first register 85, a second register 86, a 2-field difference determination comparator 189, an exclusive-OR (EOR) circuit 190, a counter 92, and a count determination comparator 93.

Although not shown, a field pulse VP and a frame pulse FP are generated by a timing generation circuit.

The absolute value circuit 81 obtains an absolute value of the inter-field pixel level difference Sp, which is calculated by the subtractor 6 and corresponds to a difference in level between pixels of the input interlaced signal Vin and the 1-field delay input interlaced signal Vd1, and outputs an inter-field pixel level difference absolute value SpA.

The pixel difference determination comparator 82 compares the inter-field pixel level difference absolute value SpA with a predetermined first threshold X to provide a determination as to whether two comparison target fields have at least a great difference (a significant difference) in pixel level to such an extent that they are considered as being derived from the same parent frame. As an inter-field pixel difference determination signal Dp, which indicates a result of the determination, the pixel difference determination comparator 82 outputs "1" if the determination is "significant difference", or outputs "0" if it is "no significant difference".

The cumulative adder 83 outputs an inter-field pixel difference determination cumulative value CDp which is obtained by cumulatively summing inter-field pixel difference determination signals Dp. The inter-field pixel difference determination cumulative value CDp is a value which indicates the number of pixels having been determined as having a "significant difference" between fields of the input interlaced signal Vin and the 1-field delay input interlaced signal Vd1. Note that the cumulative adder 83 is reset for each field by the field pulse VP.

If the inter-field pixel difference determination cumulative value CDp is greater than a predetermined threshold Y, the inter-field correlation determination comparator 84 determines that there is a difference between the fields. Then, it outputs an inter-field correlation determination signal Df which indicates a result of the determination.

The value of the inter-field correlation determination signal Df is "1" if there is a difference, or outputs "0" if there is no difference.

The first register 85 and the second register 86 are D-flip-flops, and supplied with the field pulse VP as a clock. An inter-field determination result is supplied to a series circuit composed of the first register 85 and the second register 86. The first register 85 and the second register 86 output an inter-field difference stored therein to the 2-field difference determination comparator 189 and the EOR circuit 190, respectively.

In the case where outputs of the first register 85 and the second register 86 are respectively "0" and "1", or "1" and "0", differential relationships between two sequential fields in respective cases are "small and large", and "large and small". That is, they show the above-described characteristic of the telecine-converted interlaced signal. In such a case, the 2-field difference determination comparator 189 determines that the input interlaced signal Vin has been telecine-converted, and outputs "1" to increment the counter 92.

On the other hand, if the outputs of the first register 85 and the second register 86 are respectively "0" and "0", or "1" and "1", the differential relationships between the two sequential fields are "small and small" or "large and large". That is, they do not show the above-described characteristic of the telecine-converted interlaced signal. In such a case, the EOR circuit 190 resets the counter 92.

As described above, the counter 92 is incremented or reset. If a count value CDs of the counter 92 reaches a predetermined value Z, the count determination comparator 93 outputs a field interpolation method instruction signal Dvp that instructs to perform inter-field interpolation on fields of the input interlaced signal.

In actuality, however, there are various types of visual images, and therefore in some cases, it is not possible to detect a difference between parent frames of even the telecine-converted signal as a difference between fields because there is no difference or only a slight difference between the parent frames. In such a case, the field interpolation method determination device is not able to detect the telecine-converted signal.

For example, in the case of video consisting of continuous still images, where images in two parent frames are identical to each other, a difference between fields converted from different parent frames is naturally small. In such a case, the field interpolation method determination device is not able to detect the difference between the parent frames based on the difference between fields. Consequently, the conventional field interpolation method determination device is not able to detect an inter-field variation pattern specific to the telecine-converted signal, and therefore the interlaced signal is determined not to be the telecine-converted signal.

Also, in visual images of dark scenes, even if they are dynamic images, there is only a small difference in pixel level between parent frames, and therefore a difference between fields converted from different frames is also small. In such a case, similar to the above case, the field interpolation method determination device determines that the interlaced signal is not the telecine-converted signal.

Also, for example, in the case where interlaced signals for commercials, etc., which have a different frame correlation, are inserted between interlaced signals for a program, correlations between parent frames and correlations between fields may vary in a specific manner. In such a case, an inter-field difference variation pattern specific to the telecine-converted signal varies in a specific manner, and therefore, similar to the above case, the field interpolation method determination device determines that the interlaced signals are not telecine-converted signals.

As such, in the case where a difference between at least two frames cannot be detected, the conventional field interpolation method determination device is not able to identify the telecine-converted signal, even if the input interlaced signal is the telecine-converted signal. As a result, the video signal processing device carries out intra-field interpolation until input interlaced signals for at least a predetermined number of fields are continuously determined to be the telecine-converted signal. Accordingly, it is often the case where an original parent frame cannot be generated with high vertical resolution.

Also, the above conventional technique has been described such that in the telecine conversion, a parent frame is generally converted into an odd field and an even field following immediately thereafter. In actuality, however, on rare occasion, a telecine-converted signal is obtained by converting the parent frame into an even field and an odd field following immediately thereafter.

The conventional field interpolation method determination device selects a frame immediately before or after an interpolation target signal as an interpolation video signal depending on whether the target signal corresponds to an odd frame or an even frame. Accordingly, in a signal where positional relationships between fields converted from parent frames are reversed, two fields converted from different parent frames are interpolated with each other and converted into one frame. As a result, different images are present in one frame, and therefore video quality of a progressive signal obtained by conversion is considerably deteriorated.

Therefore, an object of the present invention is to provide a field interpolation method determination device capable of accurately detecting a field-to-frame relationship of an input interlaced signal even if it is not possible, or it is difficult, to specifically detect a difference between parent frames, thereby determining whether to use either inter-field interpolation or intra-field interpolation to perform an interpolation operation.

DISCLOSURE OF THE INVENTION

To achieve the above object, the present invention has the following features.

A first aspect of the present invention is directed to a field interpolation method determination device for determining whether to perform either an inter-field interpolation method or an intra-field interpolation method on fields of an inputted interlaced signal to provide conversion to a progressive signal, the device comprising:

pixel level difference detection means for detecting a pixel level difference between an input interlaced signal and a 1-field delay input interlaced signal obtained by delaying the input interlaced signal by one field;

field correlation detection means for detecting correlation between the input interlaced signal and the 1-field delay input interlaced signal based on the pixel level difference, and outputting inter-field correlation determination signals;

inter-field correlation storage means for storing N-1 inter-field correlation determination signals corresponding to N sequential fields of the input interlaced signal;

field/frame correlation determination means for determining, based on a pattern of values of the N-1 inter-field correlation determination signals, whether the N sequential fields are either 2-2 or 2-3 pulldown-converted; and interpolation method determination means for determining, as an interpolation method, inter-field interpolation if the fields are determined to have been neither 2-2 nor 2-3 pulldown-converted, or intra-field interpolation if the fields are determined to have been neither 2-2 nor 2-3 pulldown-converted.

In the above first aspect, sequential fields, which exceed N-1 fields corresponding to two parent frames, are targeted for determination, and correlations between at least N fields are detected. A parent-frame-to-field relationship is determined in a multistage manner based on the correlations between the N fields, achieving a significant effect of more accurately determining a method for interpolating the input interlaced signal.

Also, the parent-frame-to-field relationship is determined based on a pattern of correlations between all fields targeted for determination, whereby it is possible to achieve a significant effect of increasing accuracy in determining the method for interpolating the input interlaced signal with an increase in number of fields targeted for determination.

Also, in the case where the parent-frame-to-field relationship cannot be reliably determined, a distinction result for an input interlaced signal before determination is not changed. This prevents erroneous distinction between input interlaced signals due to an unreliable determination result, achieving a significant effect of more accurately determining the method for interpolating the input interlaced signal.

In a second aspect based on the first aspect, the device further comprises interpolation method determination delay means for delaying a determination of the interpolation method by the interpolation method determination means by a predetermined time period.

In a third aspect based on the second aspect, the predetermined time period is determined based on a time lag from when the interpolation method of inputted fields are determined until an interpolation process is actually performed.

In a fourth aspect based on the third aspect, the predetermined time period is determined to be around 0.5 seconds based on mechanical/electrical characteristics of the field interpolation method determination device and a device which carries out the field interpolation process.

In a fifth aspect based on the second aspect, counter means increments by one count if the fields are determined to have been either 2-2 or 2-3 pulldown-converted, resets a count value if they are determined to have been neither 2-2 nor 2-3 pulldown-converted, or maintains the count value if otherwise, and the interpolation method determination means selects the inter-field interpolation if the count value is greater than a predetermined value, or selects the intra-field interpolation if the count value is less than or equal to the predetermined value.

In a sixth aspect based on the first aspect, if the input interlaced signal is a 2-3 pulldown-converted, N is equal to or more than 6.

In a seventh aspect based on the first aspect, if the input interlaced signal is a 2-2 pulldown-converted, N is equal to or more than 5.

In an eighth aspect based on the first aspect, if at least two sequential signals among the N-1 inter-field correlation determination signals indicate absence of correlation, the field/frame correlation determination means determines that the input interlaced signal have been neither 2-2 nor 2-3 pulldown-converted.

In a ninth aspect based on the first aspect, if the N-1 inter-field correlation determination signals alternately indicate presence and absence of correlation, the field/frame correlation determination means determines that the input interlaced signal have been either 2-2 or 2-3 pulldown-converted.

In a tenth aspect based on the first aspect, the field correlation detection means includes:

pixel difference determination means for determining for each pixel whether the pixel signal level difference is greater than a first threshold which indicates a predetermined pixel level and outputting a pixel unit level difference determination result represented by a binary value;

field unit level difference determination means for adding one field to the pixel unit level difference determination result, and outputting a field unit level difference determination result; and inter-field correlation determination means for determining whether inter-field correlation is significant based on whether the field unit level difference determination result is greater than a second threshold indicating a predetermined number of pixels.

In an eleventh aspect based on the tenth aspect, the inter-field difference determination means further includes: signal level detection means for detecting a signal level indicating brightness of an image represented by the 1-field delay input interlaced signal; and first threshold change means for changing the first threshold based on the value of the signal level.

In a twelfth aspect based on the tenth aspect, the inter-field difference determination means further includes: signal level detection means for detecting a signal level indicating brightness of an image represented by the 1-field delay input interlaced signal; and second threshold change means for changing the second threshold based on the value of the signal level.

In the eleventh or twelfth aspect, a threshold for detecting the inter-field correlation is changed in accordance with the brightness of the image represented by the input interlaced signal, achieving a significant effect of more accurately detecting an inter-field correlation in an input interlaced signal for a dark visual image where the inter-field correlation is hard to detect.

In a thirteenth aspect based on the first aspect, the inter-field difference determination means further includes: field identification means for outputting, based on the 1-field delay input interlaced signal, a field identification signal which indicates whether a field of the 1-field delay input interlaced signal is an even field or an odd field; and an AND circuit for calculating a logical product of the field identification signal and the inter-field correlation determination signal, and outputting the product to the inter-field difference storage means.

In the thirteenth aspect, a parent frame-to-field relationship is determined based on a logical product of an inter-field correlation detection result and an even field/off field detection result for an interpolation target field. Thus, it is possible to achieve a significant effect of preventing misinterpolation of a field before or after an interpolation target field which occurs due to a reversal of the order of even and odd fields, even in the case where an interlaced signal, where the order of the even and odd fields are reversed with respect to a parent frame, is inputted to a device which interpolates the field before or after the interpolation target field based on a detection result of the even field or the odd field.

In a fourteenth aspect based on the thirteenth aspect, the inter-field difference determination means further includes: an inverter for outputting a reversed signal of the field identification signal; and a field identification signal reverse switch for selectively outputting either the field identification signal or the reversed signal to the AND circuit.

In the fourteenth aspect, the switch is provided for selecting an even field/odd field detection result for the interpolation target field and a reversed signal for the even field/odd field detection result, and a parent frame-to-field relationship is determined based on a logical product of the even field/odd field detection result selected by the switch and an inter-field correlation detection result. Thus, it is possible to achieve a significant effect of selecting a field separated from the same parent frame of the interpolation target field and generating the original parent frame, even in the case where an interlaced signal, where the order of the even and odd fields are reversed with respect to a parent frame, is inputted to a device which interpolates the field before or after the interpolation target field based on a detection result of the even field or the odd field.

BRIEF DESCRIPTION OF THE DRAWINGS

FIG. 3 is a table showing relationships between output values of first through fourth registers shown in FIG. 2 and signals inputted into a counter.

FIG. 4 is a diagram showing relationships between fields of input interlaced signals and frames of a progressive signal after conversion in accordance with the first embodiment of the present invention.

FIG. 10 is a block diagram showing a structure of a video signal processing device having incorporated therein a conventional field interpolation method determination device according to a fourth embodiment of the present invention.

FIG. 11 is a diagram showing a detailed structure of a field interpolation method determination section shown in FIG. 10.

BEST MODE FOR CARRYING OUT THE INVENTION

Figure 1:
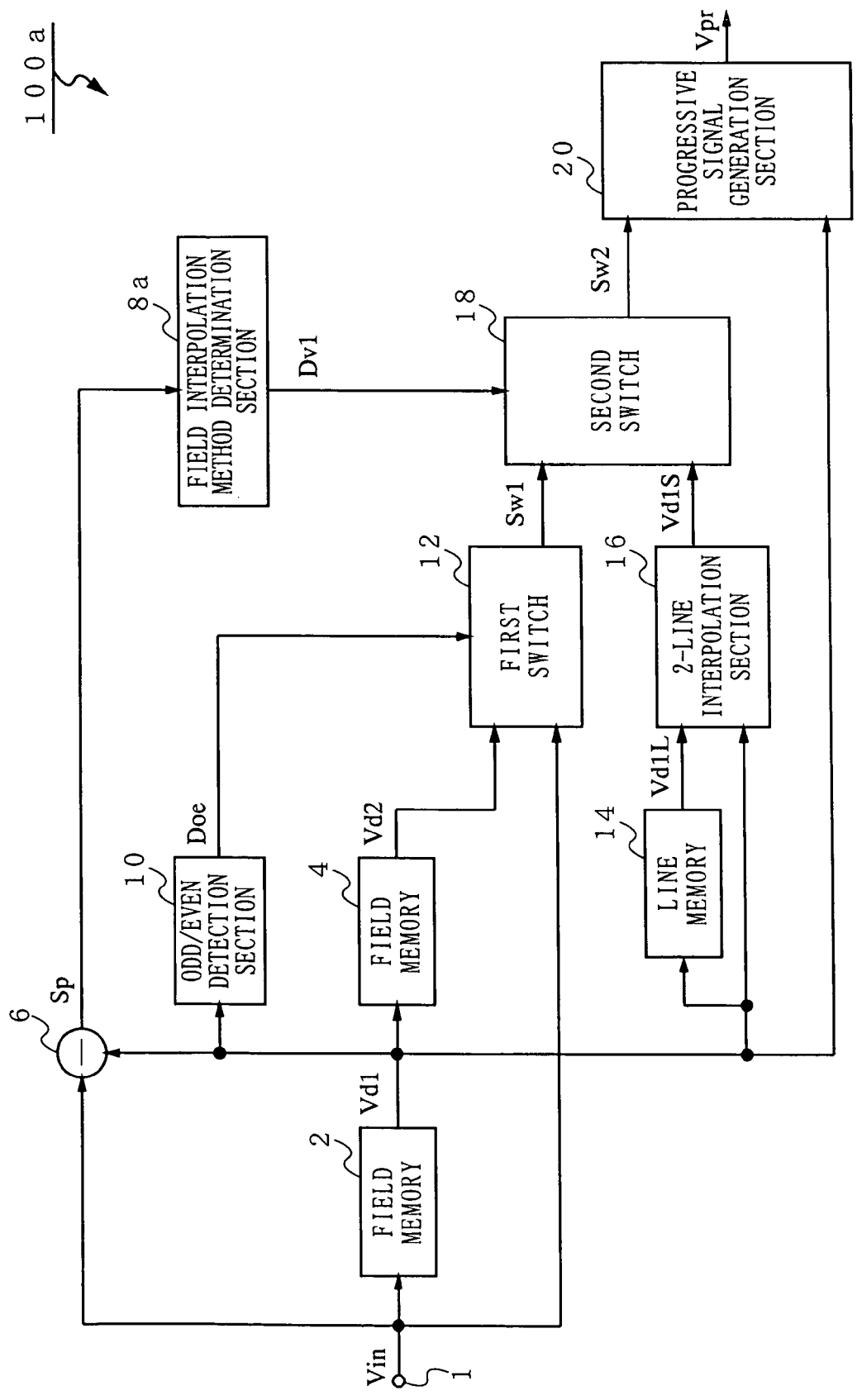
FIG. 1 is a block diagram showing a structure of a video signal processing device having incorporated therein a field interpolation method determination device according to a first embodiment of the present invention.

Before specifically describing field interpolation method determination devices according to embodiments of the present invention, the basic concept of the present invention is now described. As described in relation to conventional techniques, an erroneous determination by a field interpolation method determination device is caused because there is no difference, or only a slight difference, between parent frames, so that a difference between fields converted from two different frames.

In the case where fields targeted for determination include only one border between parent frames, so that it is not possible to detect a difference between two parent frames of an input interlaced signal, the conventional field interpolation method determination device determines to carry out intra-interpolation.

However, even in the case where no difference between two parent frames can be specifically detected, if the number of fields targeted for determination is increased so as to increase inter-parent frame borders among the fields, it is made possible to evaluate correlations between parent frames and fields in a multistage manner.

From this point of view, it is apparent that the field interpolation method determination device can more accurately identify a video signal if the number of fields targeted for determination is increased. That is, in order to more accurately identify the video signal, it is desirable to increase the number of fields targeted for determination to infinity. However, it also increases the number of registers for storing differences between fields, resulting in an infinite increase in cost of the field interpolation method determination device.

Accordingly, in the present invention, the number of fields targeted for determination is dynamically changed based on differences between a predetermined number or more of fields including at least two inter-field borders. Accordingly, if the number of fields converted from two parent frames is N-1, differences between at least N fields are targeted for determination. That is, the number of differences between fields targeted for determination is at least N-1.

Also, if a difference between parent frames is insignificant, and therefore cannot be detected as a difference between fields, a threshold for determining an inter-field difference is dynamically changed in order to detect a smaller inter-field difference.

In the present invention, the number of fields targeted for determination or the threshold for detecting the inter-field difference is dynamically changed based on the above technical idea, making it possible to more accurately identify a video signal.

Also, as described above, in a telecine-converted signal in which positional relationships between fields converted from parent frames are reversed, two fields converted from different parent frames are interpolated with each other to form a frame. As a result, different images are contained in one frame, and therefore video quality of a progressive signal obtained by conversion is considerably deteriorated.

Such an interlaced signal, where positional relationships between fields converted from parent frames are reversed, is opposite to an ordinary telecine-converted signal in terms of relationships in size between fields and relationships between odd and even fields. Therefore, in the present invention, a signal, which indicates correlation between fields, is corrected by a detection signal, which indicates whether fields are odd-/even-numbered, thereby preventing fields converted from different frames from being subjected to mutual inter-field interpolation.

In the present invention, relationships between fields and parent frames in an interlaced signal converted from a progressive signal are determined, and each field of the interlaced signal is interpolated using inter-field interpolation or intra-field interpolation. Described below is a case where a 2-2 pulldown telecine-converted signal is detected as a typical example of a signal obtained by converting the progressive signal into the interlaced signal.

FIRST EMBODIMENT

Referring to FIG. 1, a video signal processing device having therein a field interpolation method determination device according to the present invention is described. A video signal processing device 100a shown in the figure is operable to determine relationships between fields and parent frames in an input interlaced signal, and if the input interlaced signal is a telecine-converted signal, it converts the fields of the input interlaced signal into frames of a progressive signal by performing inter-field interpolation. On the other hand, if the input interlaced signal is not a telecine-converted signal, the video signal processing device 100a converts the fields of the input interlaced signal into the frames of the progressive signal by performing intra-field interpolation.

The video signal processing device 100a includes an input terminal 1, a field memory 2, a field memory 4, a subtractor 6, a field interpolation method determination section 8a, an ODD/EVEN detection section 10, a first switch 12, a line memory 14, a 2-line interpolation section 16, a second switch 18, and a progressive signal generation section 20.

The input terminal 1, the field memory 2, the field memory 4, the subtractor 6, the ODD/EVEN detection section 10, the first switch 12, the line memory 14, the 2-line interpolation section 16, the second switch 18, and the progressive signal generation section 20 are the same as those of the conventional video signal processing device 200 shown in FIG. 11, and therefore the descriptions thereof are omitted.

The field interpolation method determination section 8a determines relationships between fields and parent frames in the input interlaced signal based on an inter-field pixel level difference Sp, and determines whether to use either inter-field interpolation or intra-field interpolation to convert a 1-field delay input interlaced signal Vd1 into a progressive signal.

Figure 2:
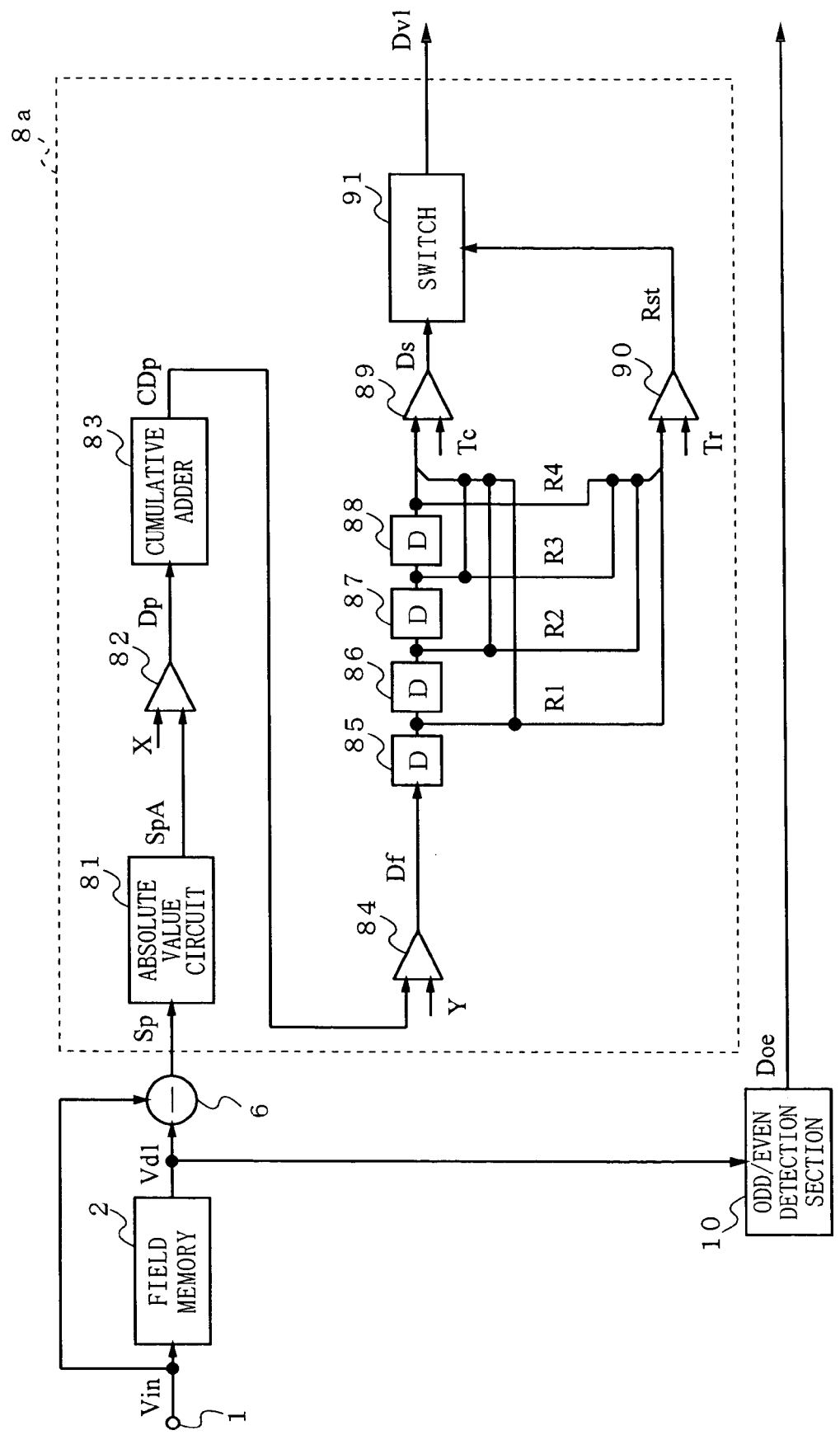
FIG. 2 is a diagram showing a detailed structure of a field interpolation method determination section shown in FIG. 1.

Referring to FIG. 2, a configuration of the field interpolation method determination section 8a is described. The field interpolation method determination section 8a includes an absolute value circuit 81, a pixel difference determination comparator 82, a cumulative adder 83, an inter-field correlation determination comparator 84, a first register 85, a second register 86, a third register 87, a fourth register 88, a 4-field correlation determination comparator 89, a reset determination circuit 90, and a switch 91.

Although not shown, a field pulse VP and a frame pulse FP are generated by a timing generation circuit.

The absolute value circuit 81 obtains an absolute value of the inter-field pixel level difference Sp calculated by the subtractor 6, and outputs it as an inter-field pixel level difference absolute value SpA. Note that, in the interlaced signal, scanning lines of adjacent fields are displaced by one row from each other. Accordingly, the subtractor 6 obtains a difference between an average pixel level for two adjacent lines in one field and a corresponding pixel level in the other field.

The pixel difference determination comparator 82 compares the inter-field pixel level difference absolute value SpA with a predetermined first threshold X to provide a determination as to whether two fields have at least a great difference (a significant difference) in pixel level to such an extent that they are considered as being derived from the same parent frame.

Accordingly, the first threshold X is set so as to correspond to a difference in pixel level which can be determined not to significantly differ from a difference in pixel level between fields separated from the same frame. Then, as an inter-field pixel difference determination signal Dp, which indicates a result of the determination, the pixel difference determination comparator 82 outputs "1" if the determination is "significant difference", or outputs "0" if it is "no significant difference".

The cumulative adder 83 outputs an inter-field pixel difference determination cumulative value CDp which is obtained by cumulatively summing inter-field pixel difference determination signals Dp. The inter-field pixel difference determination cumulative value CDp is a value which indicates the number of pixels having been determined as having a "significant difference" between fields of the input interlaced signal Vin and the 1-field delay input interlaced signal Vd1. Note that the cumulative adder 83 is reset for each field by the field pulse VP.

The inter-field correlation determination comparator 84 determines whether a field of the input interlaced signal Vin and a field of the 1-field delay input interlaced signal Vd1 are correlated to such an extent that they can be considered as being derived from the same frame. Specifically, the inter-field correlation determination comparator 84 determines that there is no correlation between the fields if the inter-field pixel difference determination cumulative value CDp is greater than a predetermined threshold Y. On the other hand, the inter-field correlation determination comparator 84 determines that there is correlation between fields if the inter-field pixel difference determination cumulative value CDp is less than or equal to the predetermined threshold Y. Then, the inter-field correlation determination signal Df indicating a result of the determination is outputted.

The value of the inter-field correlation determination signal Df is "0" if there is correlation, or "1" if there is no correlation.

The first register 85, the third register 86, the second register 87, and the fourth register 88 are D-flip-flops, and supplied with the field pulse VP as a clock. These four registers sequentially store a corresponding one of four sequential inter-field correlation determination signals Df. Also, values of the stored four inter-field correlation determination signals are outputted as register output signals (R1-R4).

The 4-field correlation determination comparator 89 compares the four register output signals (R1-R4) with a telecine determination table Tc to determine whether the current input video signal has an inter-field correlation pattern of a telecine-converted signal.

A table TC shown in FIG. 3 is the telecine determination table Tc. If output values of the four register output signals (R1-R4) shown in the table Tc are respectively "0101" or "1010", inter-field correlation matches the characteristic of a 2-2 pulldown telecine-converted signal in which large and small values alternate with each other. In this case, the 4-field correlation determination comparator 89 determines that the input interlaced signal Vin is a telecine-converted signal. Then, the 4-field correlation determination comparator 89 outputs a telecine determination signal Ds.

The reset determination circuit 90 compares the four register output signals (R1-R4) with a reset determination table Tr to reliably determine whether the current input video signal is a telecine-converted signal.

A table Tr shown in FIG. 3 is the reset determination table Tr. Even if any value of the four register output signals (R1-R4) which is equal to "0" is changed to "1", all patterns shown in the reset table Tr cannot correspond to either "0101" or "1010" which matches the inter-field correlation pattern of the 2-2 pulldown telecine-converted signal.

That is, it can be reliably determined that the input interlaced signal Vin is not the 2-2 pulldown telecine-converted signal. Accordingly, the reset determination circuit 90 outputs a reset signal Rst.

Also, a table T1 shown in FIG. 3 shows four register output signals (R1-R4) which do not belong to either the telecine determination table Tc or the reset determination table Tr. Each set of output values of the registers shown in the table T1 matches the inter-field correlation pattern of the 2-2 pulldown telecine-converted signal if the output value of at least one register is changed from "0" to "1".

The switch 91 outputs, based on the telecine determination signal Ds and the reset signal, a field interpolation method instruction signal Dv1 that instructs to perform either inter-field interpolation or intra-field interpolation on the 1-field delay input interlaced signal Vd1.

Specifically, the switch 91 outputs a field interpolation method instruction signal Dv1 that instructs to perform inter-field interpolation if the telecine determination signal Ds is outputted, while it outputs a field interpolation method instruction signal Dv1 that instructs to perform intra-field interpolation if the reset signal Rst is outputted. Also, if neither the telecine determination signal Ds nor the reset signal Rst is outputted, the switch 91 does not change the field interpolation method instruction signal Dv1.

Next, referring to FIG. 4, an operation of the video signal processing device 100a is described. The input interlaced signal Vin is obtained by converting parent frames A, B, and C of a progressive signal into A1 and A2, B1 and B2, and C1 and C2, respectively. Fields of the input interlaced signal Vin are entered in "field No." in the order from smallest to largest.

Correlation between two fields is determined based on a difference between the input interlaced signal Vin and the 1-field delay input interlaced signal Vd1. For example, correlation between field B2 in field No. 4 of the input interlaced signal Vin and field B1 of the 1-field delay input interlaced signal Vd1 is determined. In this case, the fields are both converted from the same frame B, and therefore a difference therebetween is small. That is, they are determined as having a correlation, and the value of the field correlation determination signal Df is "0".

As for field No. 5 of the input interlaced signal Vin, field C1 of the input interlaced signal Vin and field B2 of the 1-field delay input interlaced signal Vd1 are converted from different frames, and therefore there is a large difference therebetween. That is, they are determined as having no correlation, and the value of the field correlation determination signal Df is "1".

The field correlation determination signal Df sequentially stored into four registers 85-88, and four sequential register outputs are represented by "0101" or "1010".

As such, if values of the field correlation determination signal Df are "0101" or "1010", the switch 91 outputs a signal that instructs to perform inter-field interpolation as the interpolation method instruction signal Dv1.

In this case, the first switch 12 selects either the input interlaced signal Vin or the 2-field delay input interlaced signal Vd2 based on a field identification signal Doe obtained by the ODD/EVEN detector 10.

Specifically, if the 1-field delay input interlaced signal Vd1 corresponds to an odd field, the input interlaced signal Vin is selected. On the other hand, if the 1-field delay input interlaced signal Vd1 corresponds to an even field, the 2-field delay input interlaced signal Vd2 is selected.

For example, if the field B2 in field No. 4 is inputted as the input interlaced signal Vin, a field inputted as an interpolation target signal to the progressive signal generation section 20 is the field B1 in field No. 3. In this case, inter-field interpolation is performed using the field B2, which is the input interlaced signal Vin, as an interpolation signal Sw2 to generate the original parent frame B.

Also, if field C1 in field No. 5 is inputted as the input interlaced signal Vin, a field inputted as an interpolation target signal to the progressive signal generation section 20 is the field B2 in field No. 4. In this case, inter-field interpolation is performed using the field B1, which is the 2-field delay input interlaced signal Vd2, as the interpolation signal Sw2 to generate the original parent frame B.

In the conventional field interpolation method determination device, correlation between two fields containing only one border between parent frames is used as a determination target to detect a correspondence between parent frames and fields, thereby detecting a telecine-converted signal. Then, in the case where no difference between frames can be detected, the correspondence between parent frames and fields is unclear, and therefore the field interpolation method determination device determines that the input interlaced signal is not a telecine-converted signal.

On the other hand, in the field interpolation method determination device according to the present embodiment, differences between fields in such a number as to contain two or more inter-frame borders are targeted for determination. Accordingly, even if a difference between frames cannot be detected, it is possible to determine whether the input interlaced signal is the telecine-converted signal based on a plurality of inter-frame differences. Also, a plurality of frame borders are contained in the determination target, and therefore it is possible to evaluate all fields targeted for determination in a multistage manner based on a determination about each frame border.

Accordingly, even if no inter-frame difference can be detected, an intermediate determination is not made to immediately provide a determination of not being the telecine-converted signal. Therefore, even if an inter-frame difference cannot be specifically detected, a previous field interpolation method is not changed, causing no reduction in image quality due to an erroneous instruction to perform intra-field interpolation. Thus, even if the telecine-converted signal from which any inter-frame difference is difficult to detect is inputted, the field interpolation method determination device according to the present embodiment is able to more accurately determine a field interpolation method.

SECOND EMBODIMENT

Figure 5:
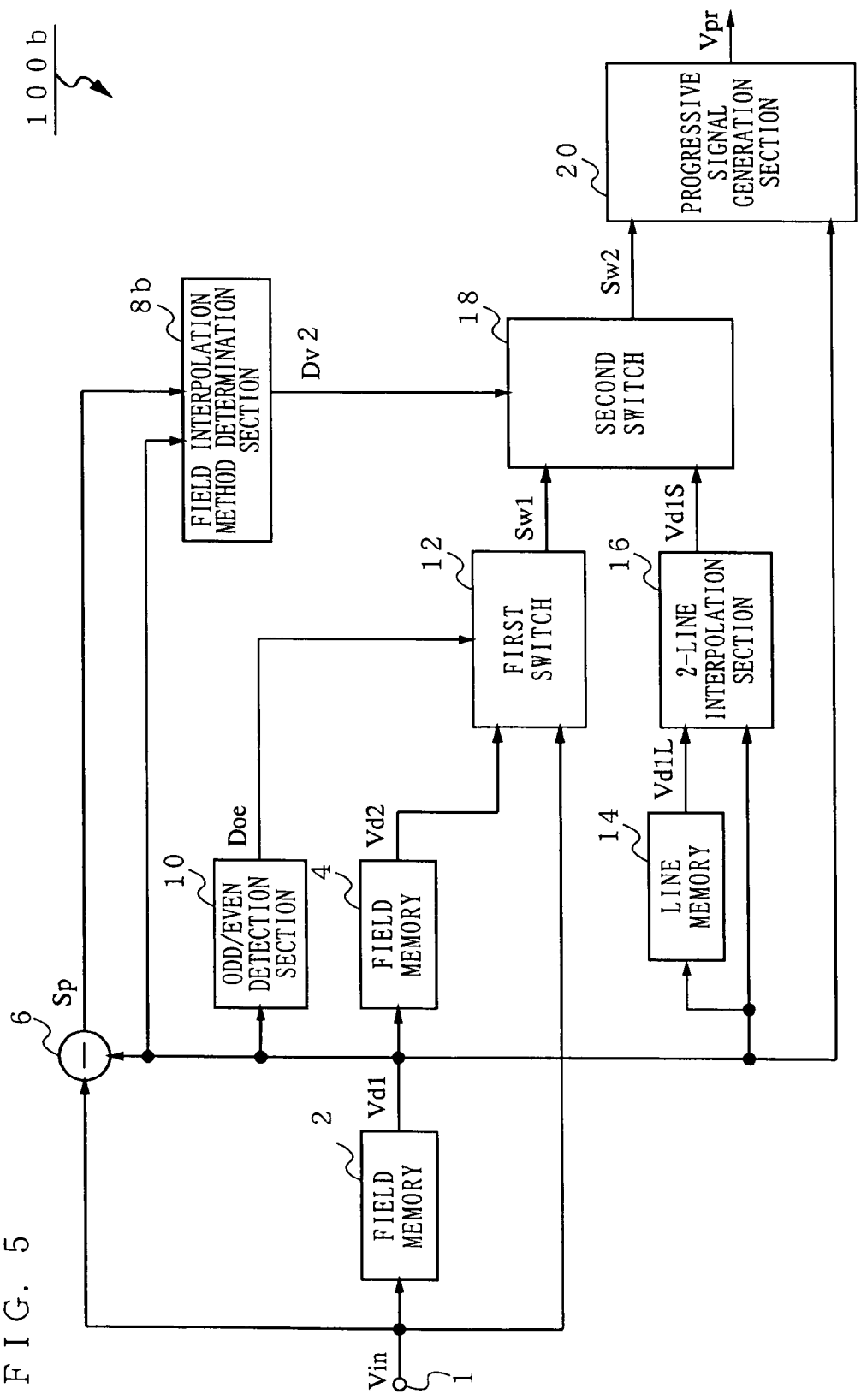
FIG. 5 is a block diagram showing a structure of a video signal processing device having incorporated therein a field interpolation method determination device according to a second embodiment of the present invention.

Referring to FIG. 5, a video signal processing device having incorporated therein a field interpolation method determination device according to a second embodiment of the present invention is described. The field interpolation method determination device according to the present embodiment is characterized in that even in the case where a visual image is dark, so that a difference in pixel level between parent frames is small, a threshold for determining an inter-field pixel difference can be changed in accordance with the brightness of the visual image, whereby it is possible to detect an inter-field difference resulted from an inter-frame difference.

Accordingly, a configuration of a video signal processing device 100b shown in FIG. 5 is different from that of the video signal processing device according to the first embodiment in that the field interpolation method determination section 8a is replaced with a field interpolation method determination section 8b. In order to avoid redundant descriptions, the same elements as those of the video signal processing device according to the first embodiment are not described.

The video signal processing device 100b includes an input terminal 1, a field memory 2, a field memory 4, a subtractor 6, a field interpolation method determination section 8b, an ODD/EVEN detection section 10, a first switch 12, a line memory 14, a 2-line interpolation section 16, a second switch 18, and a progressive signal generation section 20.

The field interpolation method determination section 8b determines relationships between fields and parent frames in an input interlaced signal, based on a 1-field delay input interlaced signal Vd1 and an inter-field pixel level difference Sp, and determines whether to use either inter-field interpolation or intra-field interpolation to convert the 1-field delay input interlaced signal Vd1 into a progressive signal.

Figure 6:
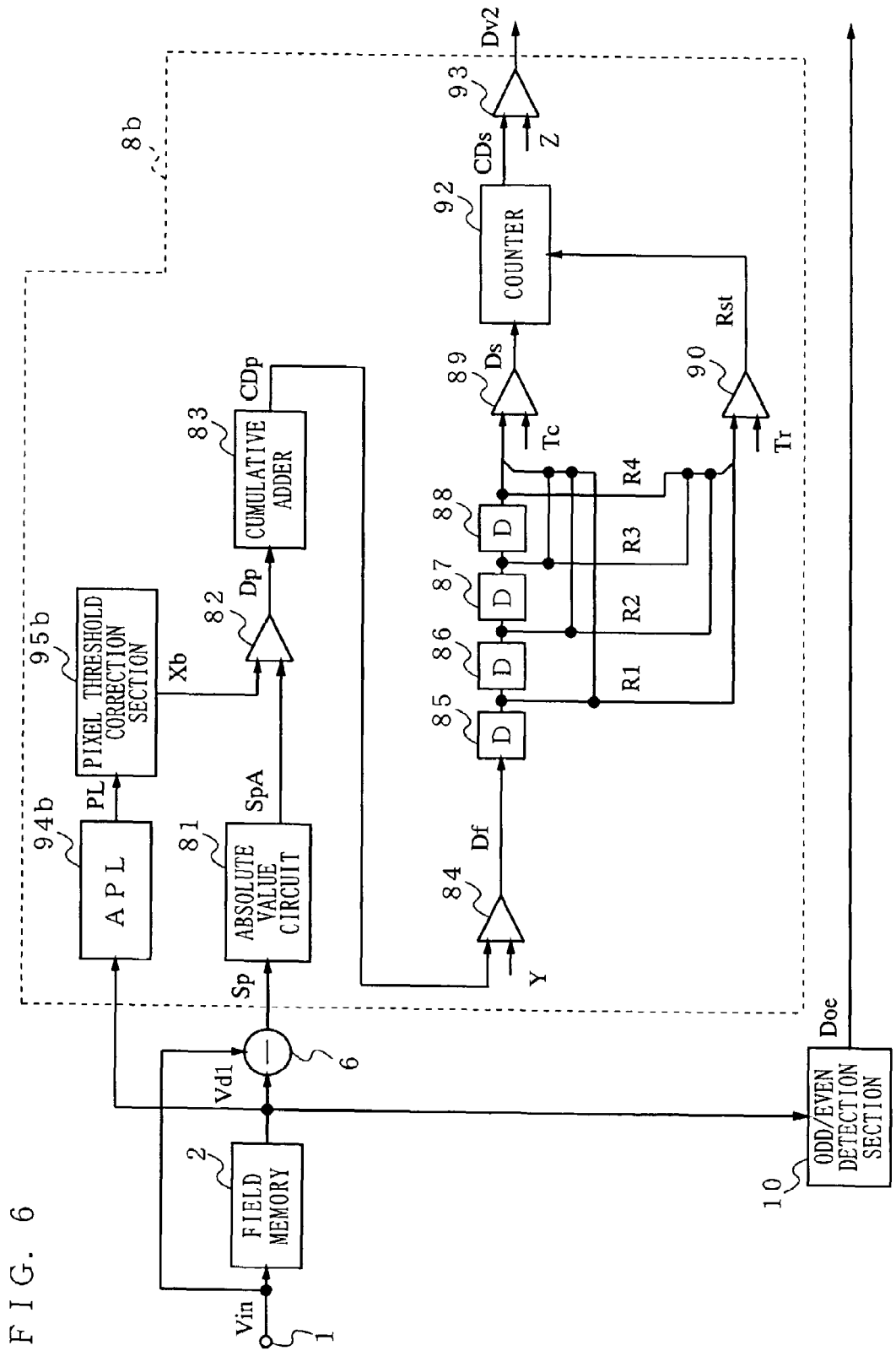
FIG. 6 is a diagram showing a detailed structure of a field interpolation method determination section shown in FIG. 5.

Referring to FIG. 6, a configuration of the field interpolation method determination section 8b is described. The configuration of the field interpolation method determination section 8b is different from that of the field interpolation method determination section 8a according to the first embodiment in that the switch 91 is replaced by a counter 92 and a count determination comparator 93, and an auto picture level (APL) detector 94b and a pixel difference threshold change section 95b are added.

The field interpolation method determination section 8b includes an absolute value circuit 81, a pixel difference determination comparator 82, a cumulative adder 83, an inter-field correlation determination comparator 84, a first register 85, a second register 86, a third register 87, a fourth register 88, a 4-field correlation determination comparator 89, a reset determination circuit 90, the counter 92, the count determination comparator 93, the auto picture level detector 94b, and the pixel difference threshold change section 95b.

The auto picture level detector 94b detects a signal level PL of the 1-field delay input interlaced signal Vd1. The signal level PL is increased as a visual image becomes brighter, while it is decreased as the image becomes darker.

The pixel difference threshold change section 95b changes the value of a pixel difference threshold Xb based on the signal level PL in accordance with a predetermined rule. For example, values of a plurality of pixel difference thresholds Xb may be predetermined so as to correspond to degrees of the signal level PL, making it possible to output the value of a corresponding pixel difference threshold Xb in accordance with an inputted signal level PL, or the value of the pixel difference threshold Xb may be obtained based on the signal level PL in accordance with a predetermined mathematical expression.

In any case, settings are made such that the pixel difference threshold Xb is increased as the signal level PL becomes higher, and decreased as the signal level PL becomes lower.

Therefore, in the case where the 1-field delay input interlaced signal Vd1 corresponds to a dark visual image, the value of the pixel difference threshold Xb is small, and therefore the pixel difference determination comparator 82 determines that there is a difference in pixel level between fields even if the difference in pixel level is smaller. On the other hand, in the case where the 1-field delay input interlaced signal Vd1 corresponds to a bright visual image, the value of the pixel difference threshold Xb is large, and therefore it is possible to prevent an erroneous determination that there is a difference in pixel level between fields converted from the same frame.

The counter 92 counts a telecine determination cumulative value CDs which is incremented by the telecine determination signal Ds. Also, it is reset by the reset signal Rst.

Also, as described above, if there is no difference or only a slight difference between parent frames, no difference between fields converted from different frames is detected, and therefore in some cases, it is not determined as being a telecine-converted signal even if it is the telecine-converted signal. Accordingly, in the case where it is not possible to reliably determine whether the input interlaced signal Vin is the telecine-converted signal, the count of the telecine determination counter 92 is not changed.

If the telecine determination cumulative value CDs of the counter 92 exceeds a predetermined threshold Z, the count determination comparator 93 outputs a field interpolation method instruction signal Dv1 that instructs to perform inter-field interpolation on fields of the 1-field delay input interlaced signal Vd1, in order to enhance the stability of the field interpolation method determination section 8b. The threshold Z is set so as to correspond to a time period from when the telecine determination signal Ds is outputted until inter-field interpolation is actually implemented, and normally it is set so as to be 0.5 seconds.

That is, the video signal processing device according to the present embodiment has no potential for erroneous detection even in the case of a bright visual image, and is able to more accurately detect an inter-field difference even if a difference in pixel level between frames is small because of a dark visual image.

Note that in the present embodiment, although it is assumed that the first threshold X is dynamically changed based on the signal level PL of the 1-field delay input interlaced signal Vd1, the second threshold Y may be changed. This allows a determination that there is an inter-field difference even if there is only a small number of pixel levels which represent a significant difference between fields, achieving an effect similar to that achieved in the case of changing the first threshold X.

THIRD EMBODIMENT

Figure 7:
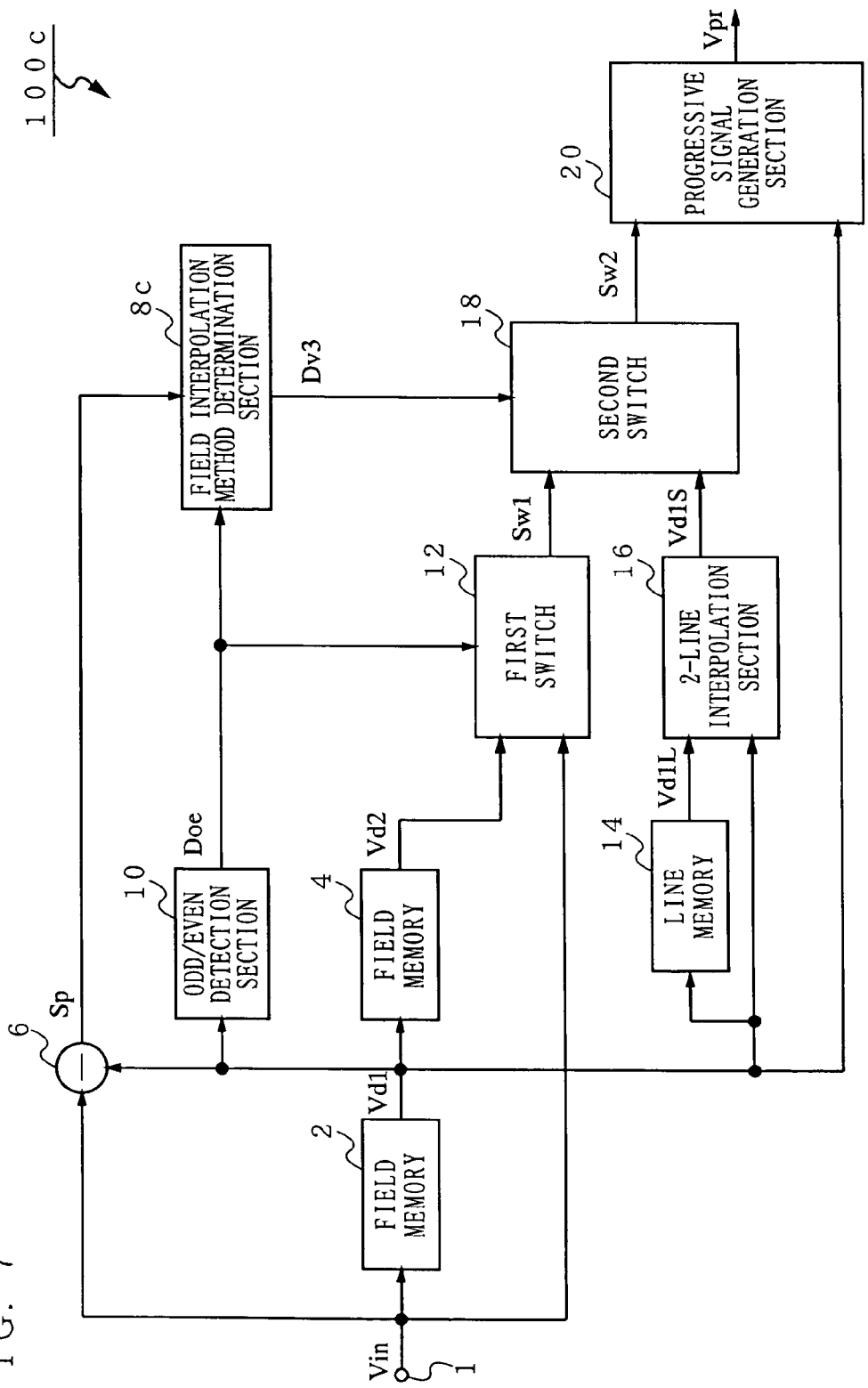
FIG. 7 is a block diagram showing a structure of a video signal processing device having incorporated therein a field interpolation method determination device according to a third embodiment of the present invention.

Referring to FIG. 7, a video signal processing device having incorporated therein a field interpolation method determination device according to a third embodiment of the present invention is described. In the field interpolation method determination devices according to the first and second embodiments, if an interlaced signal in which positional relationships between odd and even fields with respect to parent frames are reversed is inputted, inter-field interpolation is performed on fields of different parent frames. As described above, if inter-field interpolation is performed on fields converted from different parent frames, video quality of a frame to be generated is considerably deteriorated.

The field interpolation method determination device according to the present embodiment is characterized by preventing inter-field interpolation from being erroneously performed on fields converted from different frames, even in the case of receiving an interlaced signal, where positional relationships between odd and even fields with respect to parent frames are reversed, in other words, an interlaced signal, where each parent frame is converted into an even field and an odd field following immediately thereafter.

Accordingly, a configuration of the video signal processing device 100c shown in FIG. 7 is different from that of the video signal processing device according to the first embodiment in that the field interpolation method determination section 8a is replaced with a field interpolation method determination section 8c. In order to avoid redundant descriptions, the same elements as those of the video signal processing device according to the first embodiment are not described.

The video signal processing device 100c includes an input terminal 1, a field memory 2, a field memory 4, a subtractor 6, a field interpolation method determination section 8c, an ODD/EVEN detection section 10, a first switch 12, a line memory 14, a 2-line interpolation section 16, a second switch 18, and a progressive signal generation section 20.

The field interpolation method determination section 8c determines relationships between fields and parent frames in an input interlaced signal based on a field identification signal Doe and an inter-field pixel level difference Sp, and determines whether to using either inter-field interpolation or intra-field interpolation to convert a 1-field delay input interlaced signal Vd1 into a progressive signal.

Figure 8:
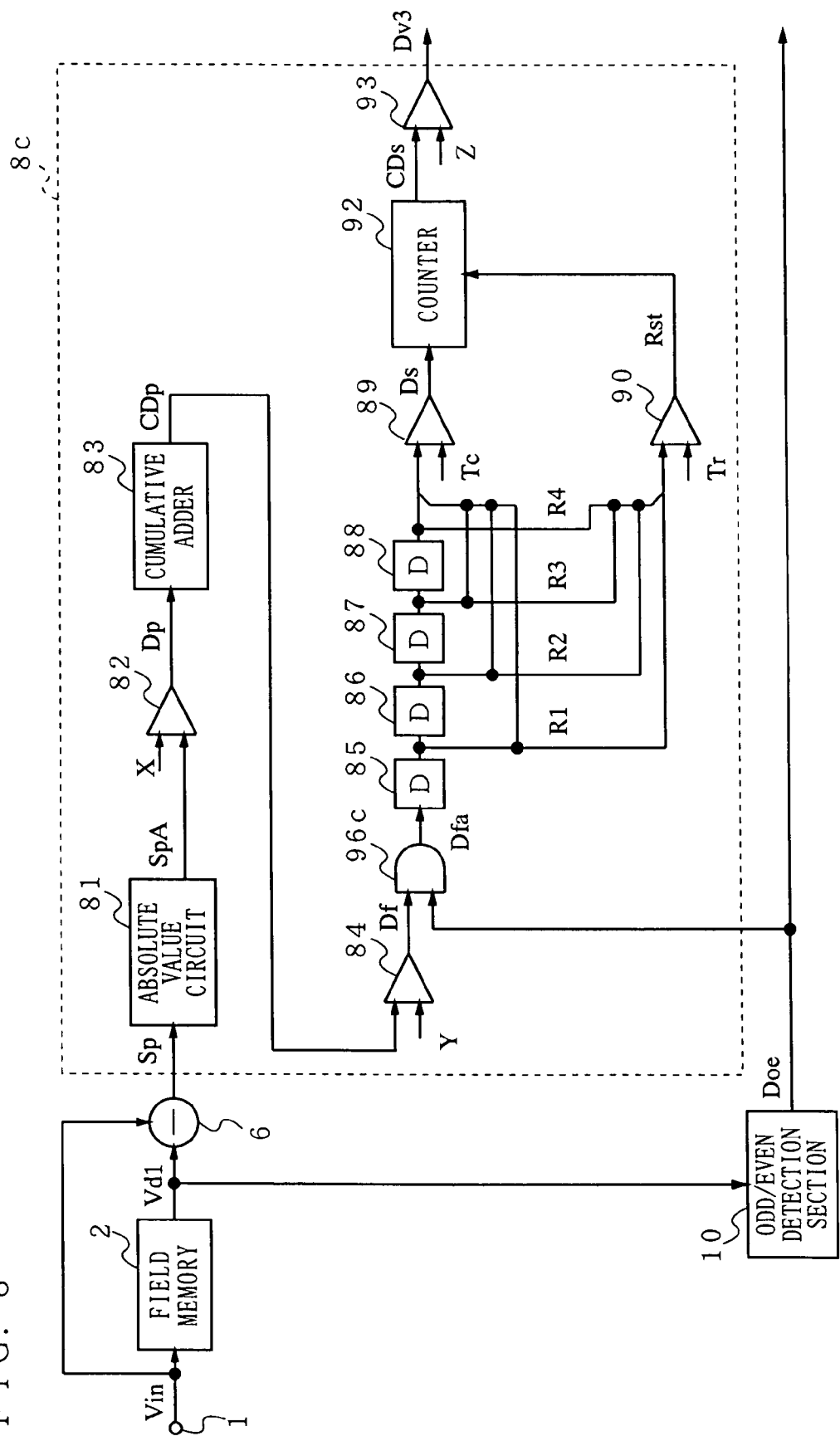
FIG. 8 is a diagram showing a detailed structure of a field interpolation method determination section shown in FIG. 7.

Referring to FIG. 8, a configuration of the field interpolation method determination section 8c is described. The configuration of the field interpolation method determination section 8c is different from the field interpolation method determination section 8 according to the first embodiment that an AND circuit 96c is added.

The field interpolation method determination section 8c includes an absolute value circuit 81, a pixel difference determination comparator 82, a cumulative adder 83, an inter-field correlation determination comparator 84, a first register 85, a second register 86, a third register 87, a fourth register 88, a 4-field correlation determination comparator 89, a reset determination circuit 90, a counter 92, a count determination comparator 93, and the AND circuit 96c.

The AND circuit 96c obtains a logical product of an inter-field difference signal Df and a field identification signal Doe, and outputs a modified inter-field difference signal Dfa. Referring to FIG. 4, the modified inter-field difference signal Dfa is described.

In the case where an ordinary telecine-converted signal is inputted, the value of the inter-field difference signal Df is "0" if the 1-field delay input interlaced signal Vd1 corresponds to an odd field, and the value of the inter-field difference signal Df is "1" if the 1-field delay input interlaced signal Vd1 corresponds to an even field.

The ODD/EVEN detection section outputs "0" as the field identification signal Doe if the 1-field delay input interlaced signal Vd1 corresponds to an odd field, while it outputs "1" as the field identification signal Doe if the 1-field delay input interlaced signal Vd1 corresponds to an even field.

In this case, the value of the modified inter-field difference signal Dfa is equal to that of the inter-field difference signal Df, and therefore a telecine detection signal Vd3, which indicates a detection result of the telecine-converted signal, is not affected.

Next, consider a case where an interlaced signal, in which positional relationships between odd and even fields with respect to parent frames are reversed, is inputted. In this case, contrary to the foregoing, if the 1-field delay input interlaced signal Vd1 corresponds to an odd field, the value of the inter-field difference signal Df is "1", and if the 1-field delay input interlaced signal Vd1 corresponds to an even field, the value of the inter-field difference signal Df is "0".

Since the value of the field identification signal Doe does not change, the value of any modified inter-field difference signal Dfa is "0". Accordingly, the counter 92 is not incremented, so that no telecine detection signal Dv3 is outputted. As a result, intra-field interpolation is performed instead of inter-field interpolation.

Thus, even in the case where the interlaced signal, in which positional relationships between odd and even fields with respect to parent frames are reversed, is inputted, it is possible to prevent inter-field interpolation from being performed on fields converted from different frames.

In the field interpolation method determination device according to the present embodiment, a considerable reduction in video quality is prevented, but because inter-field interpolation is carried out, even in the case of the telecine-converted signal, it is not possible to carry out a reconversion to the original parent frame to enhance vertical resolution.

FOURTH EMBODIMENT

A field interpolation method determination device according to a fourth embodiment is characterized by performing inter-field interpolation on fields converted from the same parent frame even in the case where an interlaced signal, in which positional relationships between odd and even fields with respect to parent frames are reversed, is inputted.

Figure 9:
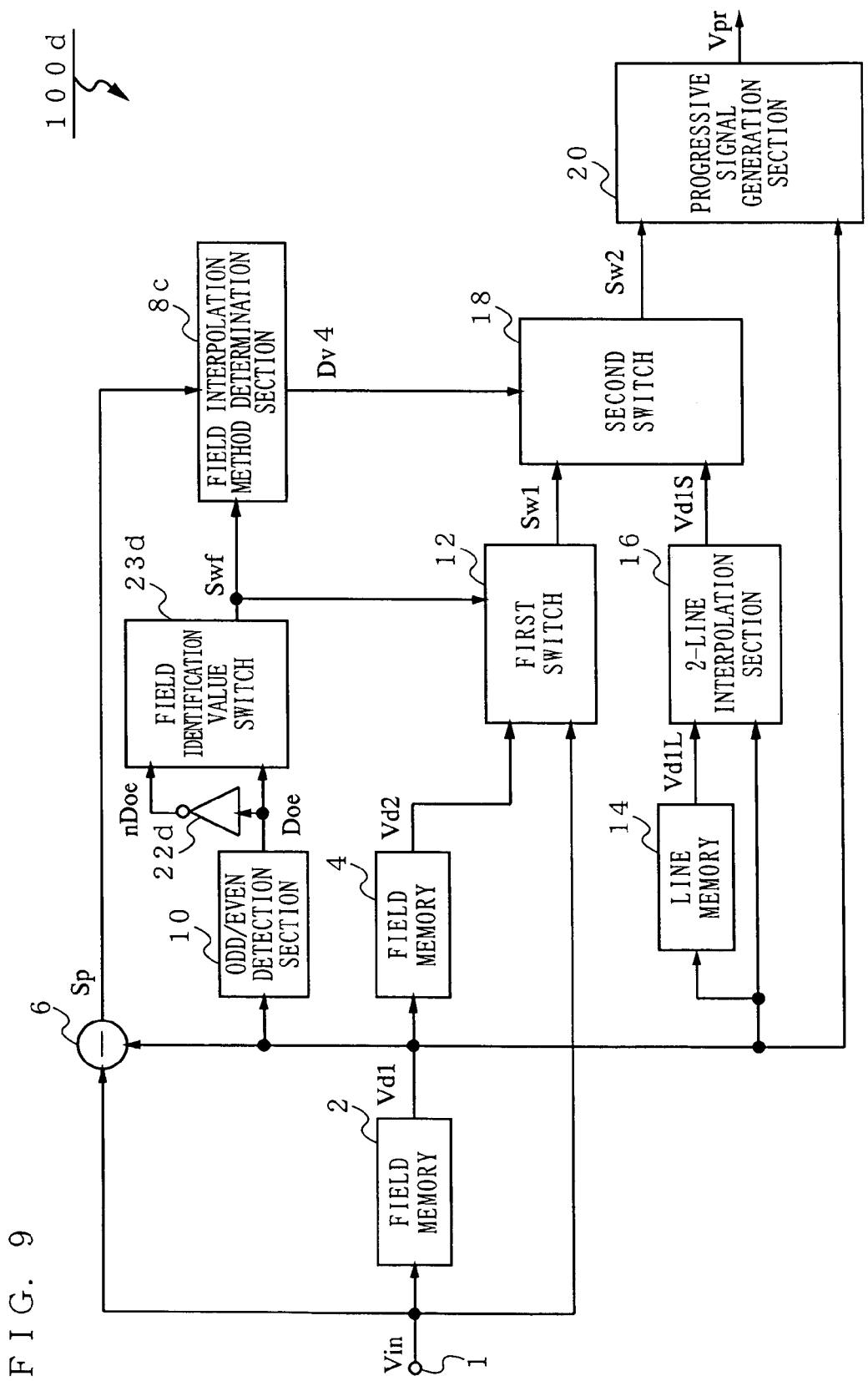
FIG. 9 is a block diagram showing a structure of a video signal processing device having incorporated therein a field interpolation method determination device according to a fourth embodiment of the present invention.

Referring to FIG. 9, a video signal processing device having incorporated therein a field interpolation method determination device according to the present embodiment is described.

The field interpolation method determination device according to the present embodiment is characterized by selectively reversing the value of the field identification signal Doe, and outputting it to the field interpolation method determination section 8c and the first switch 12.

Accordingly, a configuration of the video signal processing device 100c shown in FIG. 9 is different from that of the video signal processing device according to the third embodiment in that an inverter 22d and a field identification signal reverse switch are added. In order to avoid redundancy of descriptions, the same elements as those of the video signal processing device according to the first embodiment are not described.

The video signal processing device 100d includes an input terminal 1, a field memory 2, a field memory 4, a subtractor 6, a field interpolation method determination section 8c, an ODD/EVEN detection section 10, a first switch 12, a line memory 14, a 2-line interpolation section 16, a second switch 18, a progressive signal generation section 20, the inverter 22d, and the field identification signal change switch 23d.

The inverter 22d receives a field identification signal Doe, inverts the value of the signal, and outputs a field identification inverted signal nDoe.

The field identification signal change switch 23d selectively outputs, as a field identification signal Swf, either the field identification signal Doe or the field identification inverted signal nDoe.

In the case where an interlaced signal, in which positional relationships between odd and even fields with respect to parent frames are reversed, is inputted, the field identification signal change switch 23d is operated such that a signal, which is outputted to the field interpolation method determination section 8c and the first switch 12, is switched to the field identification inverted signal nDoe.

In this case, in the field interpolation method determination section 8c and the first switch 12, even the interlaced signal, in which positional relationships between odd and even fields with respect to parent frames are reversed, is handled in a manner similar to an ordinary interlaced signal.

Accordingly, the field interpolation method determination section 8c is able to detect a telecine-converted signal, while the first switch 12 is able to suitably select an inter-field interpolation signal. Thus, the video signal processing device according to the present embodiment is able to convert even the interlaced signal, in which positional relationships between odd and even fields with respect to parent frames are reversed, into a progressive signal with vertical resolution enhanced by inter-field interpolation.

INDUSTRIAL APPLICABILITY

As described above, the present invention provides a field interpolation method determination device capable of dynamically changing the number of fields targeted for determination and a threshold for determining correlation between fields even in the case where it is not possible or it is difficult to specifically detect a difference between parent frames, and capable of accurately detecting relationships between fields and parent frames in an input interlaced signal, thereby determining whether to perform either inter-field interpolation or intra-field interpolation.

The invention claimed is:

1. A field interpolation method determination device for determining whether to perform either an inter-field interpolation method or an intra-field interpolation method on fields of an inputted interlaced signal to provide conversion to a progressive signal, the device comprising:

pixel level difference detection means for detecting a pixel level difference between the input interlaced signal and a 1-field delay input interlaced signal obtained by delaying the input interlaced signal by one field;

field correlation detection means for detecting correlation between the input interlaced signal and the 1-field delay input interlaced signal based on the pixel level difference, and outputting inter-field correlation determination signals;

inter-field correlation storage means for storing N-1 inter-field correlation determination signals corresponding to N sequential fields of the input interlaced signal;

field/frame correlation determination means for determining, based on a pattern of values of the N-1 inter-field correlation determination signals, whether the N sequential fields are either 2-2 or 2-3 pulldown-converted;

counter means for incrementing a count value by one count if the N sequential fields are determined to have been either 2-2 or 2-3 pulldown-converted, for resetting the count value if the N sequential fields are determined to have been neither 2-2 nor 2-3 pulldown-converted, and for maintaining the count value if otherwise; and interpolation method determination means for determining, as an interpolation method, inter-field interpolation if the count value is greater than a predetermined value, or intra-field interpolation if the count value is less than or equal to the predetermined value.

2. A field interpolation method determination device according to claim 1, wherein if the input interlaced signal is 2-3 pulldown-converted, N is equal to or more than 6.

3. A field interpolation method determination device according to claim 1, wherein if the input interlaced signal is 2-2 pulldown-converted, N is equal to or more than 5.

4. A field interpolation method determination device according to claim 1, wherein if at least two sequential signals among the N-1 inter-field correlation determination signals indicate absence of correlation, the field/frame correlation determination means determines that the N sequential fields of the input interlaced signal have been neither 2-2 nor 2-3 pulldown-converted.

5. A field interpolation method determination device according to claim 1, wherein if the N-1 inter-field correlation determination signals alternately indicate presence and absence of correlation, the field/frame correlation determination means determines that the N sequential fields of the input interlaced signal have been either 2-2 or 2-3 pulldown-converted.

6. A field interpolation method determination device according to claim 1, wherein the field correlation detection means includes:

pixel difference determination means for determining for each pixel whether the pixel signal level difference is greater than a first threshold which indicates a predetermined pixel level and outputting a pixel unit level difference determination result represented by a binary value;

field unit level difference determination means for adding one field to the pixel unit level difference determination result, and outputting a field unit level difference determination result; and inter-field correlation determination means for determining whether inter-field correlation is significant based on whether the field unit level difference determination result is greater than a second threshold indicating a predetermined number of pixels.

7. A field interpolation method determination device according to claim 6, wherein the inter-field difference determination means further includes:

signal level detection means for detecting a signal level indicating brightness of an image represented by the 1-field delay input interlaced signal; and first threshold change means for changing the first threshold based on a value of the signal level.

8. A field interpolation method determination device according to claim 6, wherein the inter-field difference determination means further includes:

signal level detection means for detecting a signal level indicating brightness of an image represented by the 1-field delay input interlaced signal; and second threshold change means for changing the second threshold based on a value of the signal level.

9. A field interpolation method determination device according to claim 1, wherein the inter-field difference determination means further includes:

field identification means for outputting, based on the 1-field delay input interlaced signal, a field identification signal which indicates whether a field of the 1-field delay input interlaced signal is an even field or an odd field; and an AND circuit for calculating a logical product of the field identification signal and the inter-field correlation determination signal, and outputting the product to the inter-field difference storage means.

10. A field interpolation method determination device according to claim 9, wherein the inter-field difference determination means further includes:

an inverter for outputting a reversed signal of the field identification signal; and a field identification signal reverse switch for selectively outputting either the field identification signal or the reversed signal to the AND circuit.

* * * * *